UnitedStates Patent Office 3,253,678
Patented May 31, 1966

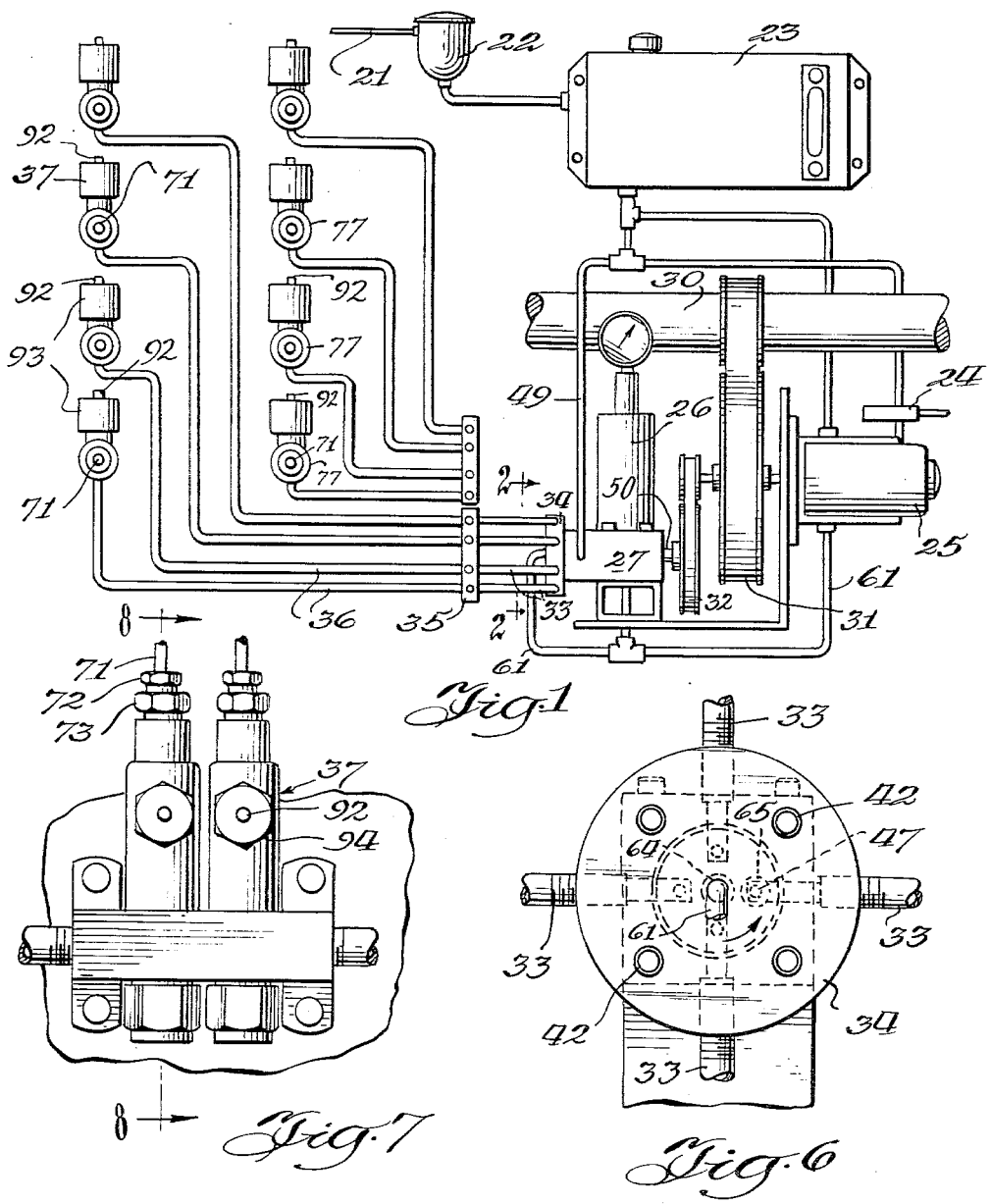

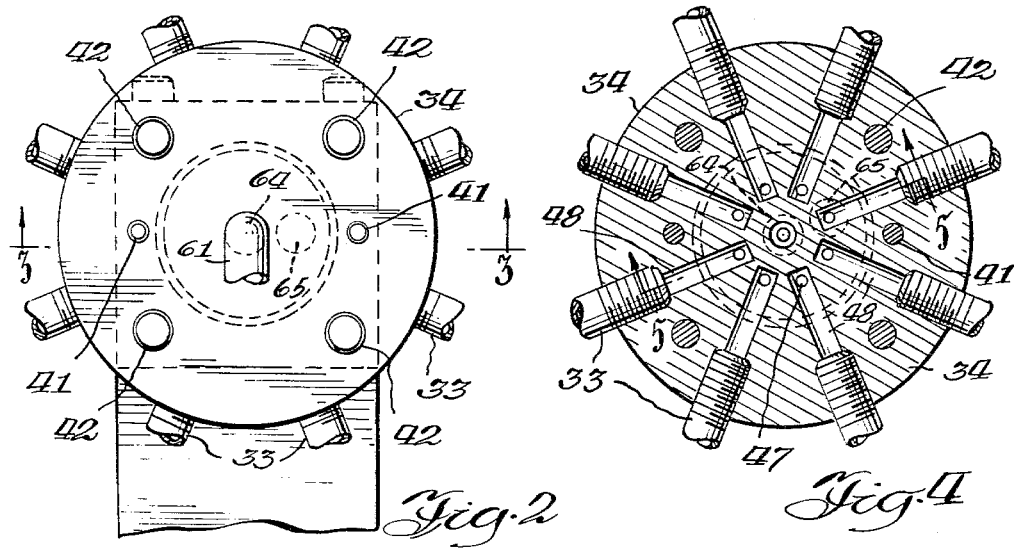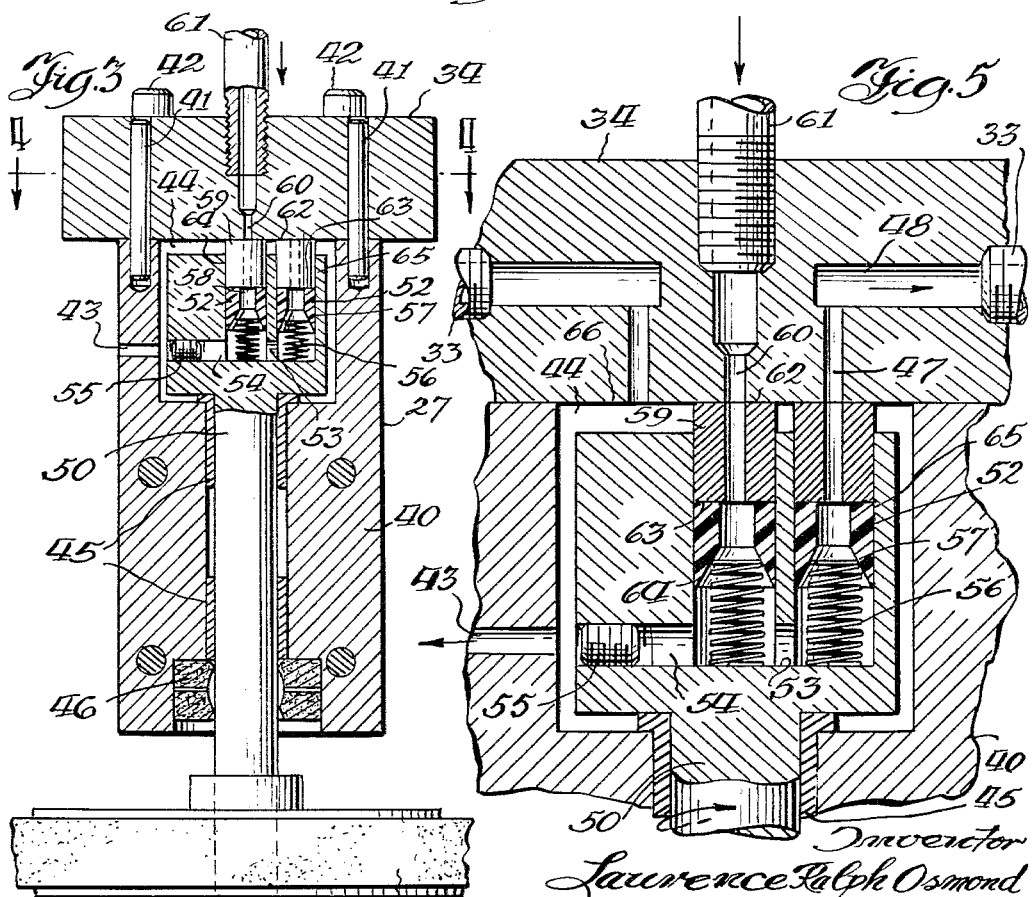

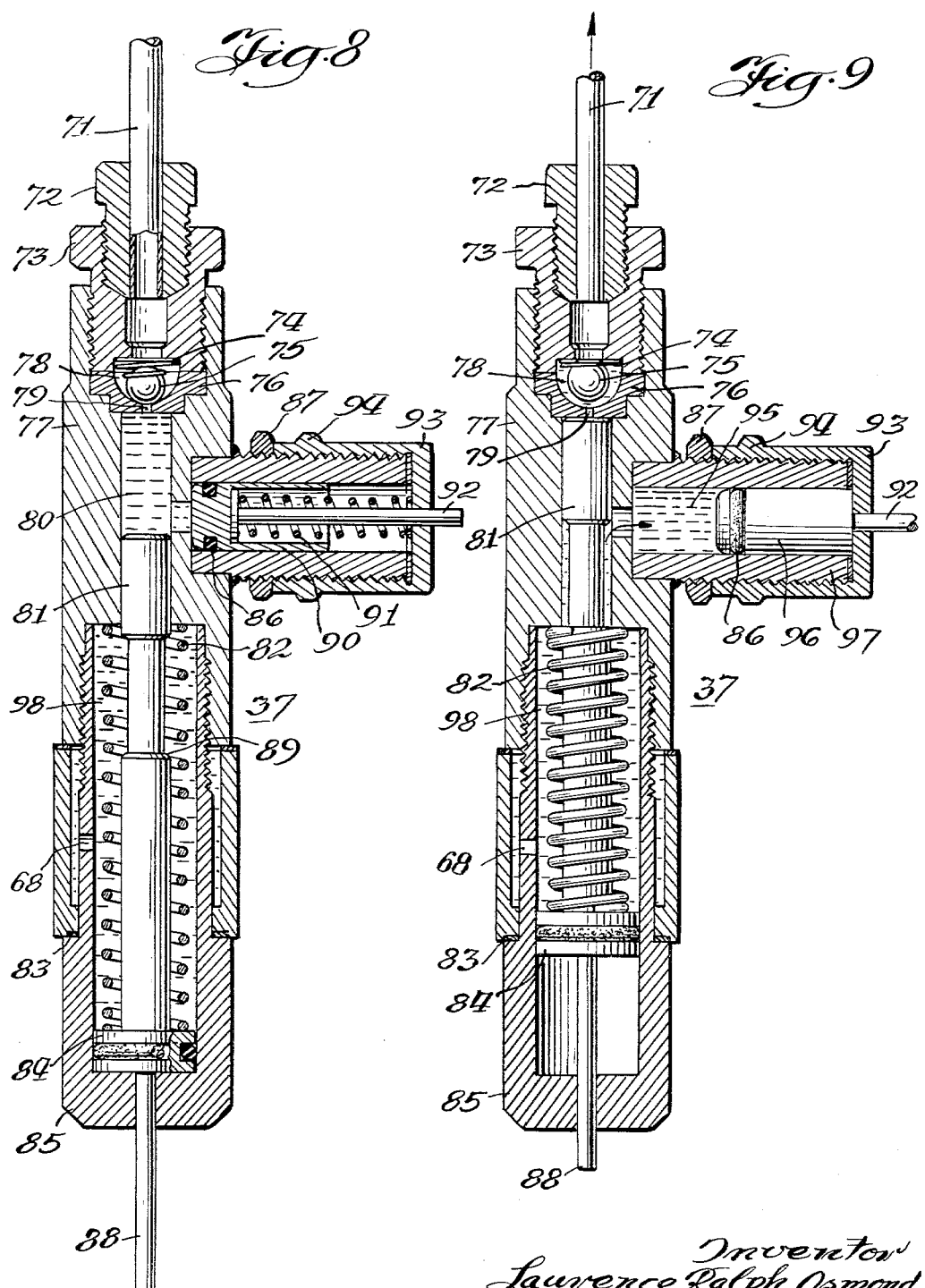

3,253,678
FLUID CONTROL SYSTEM
Laurence Ralph Osmond, Wichita, Kans., assignor, by mesne assignments, to Houdaille Industries, Inc., Buffalo, N.Y., a corporation of Michigan
Filed Sept. 10, 1963, Ser. No. 307,988
3 Claims. (Cl. 184—7)

This invention relates to a fluid control system and, more particularly, to a fluid control system which delivers an accurate predetermined quantity of fluid at a predetermined pressure to zones requiring application of the fluid. The embodiment of the invention shown and described in this application relates to a lubrication system for providing needed amounts of liquid lubricant to the pistons and cylinders of an internal combustion engine in a sequence timed in synchronization with the rotation of the engine shaft.

In internal combustion machines, the provision of oil to piston oil rings, for example, through cylinder lube ports has been found to be very wasteful when carried out on a continuous basis. Some persons have tried to control the number of "drops" of lubricant delivered to the piston oil rings, but because of the variation of the size of a "drop" of oil, this has never been a positive form of metering. The many cylinders in today's internal combustion engines require a lubrication system which can accurately deliver a predetermined quantity of oil to desired lubrication points and one which eliminates the inefficient expedient of continuously providing lubricant.

The system of this invention can deliver an accurate predetermined quantity of lubricant at the desired lubrication points and may do this during only certain strokes of the piston, or at a predetermined point, or points, at each cycle of the piston, as desired. In other words, a synchronized delivery of a positive measurement of liquid lubricant to the lubricating zone is provided as the piston passes the cylinder lubricating zone.

In the embodiment specified, the lubricant is introduced into a filter and then passed to a lubricant reservoir. From the reservoir, it is passed to pump unit and a relief valve, which cause the lubricant to be placed under a predetermined amount of pressure. The pump unit supplies the pressurized lubricant to an accumulator, which permits the storage of the compressed lubricant.

The pressurized liquid lubricant is then delivered to a distributor which blocks the lubricant while maintaining the predetermined pressure, and, at predetermined times, releases the pressurized liquid lubricant to a predetermined port in the distributor head. The pressurized liquid lubricant is delivered from the predetermined port to a metering site associated with a lubrication zone, and metering means are provided at the zone which are adapted to be actuated by the pressurized liquid lubricant to deliver a predetermined quantity of lubricant at a predetermined pressure to the associated lubrication zone.

In accordance with the invention, a rotary distributor is provided which includes distributor head means, a distributor body and rotor means associated with the distributor. The rotor means has a central inlet recess to receive the lubricant under pressure from a central inlet opening provided in the distributor head. A passage means is provided within the rotor means to connect the central inlet recess with an outlet recess which is provided to distribute a lubricant under pressure to at least one of a plurality of outlet ports which are provided in the distributor head. Fluidtight sealing means are located in the central recess and in the outlet recess, and the sealing means are adapted to abut the wall of the distributor head means which defines a central inlet opening and the wall which defines the outlet ports, respectively. Except at the abutments specified, the rotor means is spaced from the distributor head means and the distributor body, in order to provide venting space. An opening in the distributor body is provided to be in communication with the venting space in order to provide a release of pressure from the outlet ports to which fluid has previously been applied.

A more detailed explanation of the invention is provided in the following description and claims and illustrated in the accompanying drawings which disclose, by way of examples, the principle of the invention in the best mode contemplated of applying that principle.

In the drawings:
FIGURE 1 is an assembly drawing of the complete system;
FIGURE 2 is an end view of a distributor head taken along line 2—2, as indicated in FIGURE 1;
FIGURE 3 is a cross section of the rotary distributor valve taken along line 3—3 indicated in FIGURE 2;
FIGURE 4 is a cross-sectional view of the distributor head of FIGURE 3 taken along line 4—4 indicated in FIGURE 3;
FIGURE 5 is a cross-sectional view of the distributor head shown in FIGURE 4 taken along line 5—5 indicated in FIGURE 4;
FIGURE 6 is another embodiment of the invention showing the end view of a distributor head in accordance with the invention;
FIGURE 7 is a front view of a double injector in accordance with the invention;
FIGURE 8 is a cross-sectional view of the injector taken on the plane of the line 8—8 indicated in FIGURE 7; and
FIGURE 9 is another cross-sectional view of the injector taken along the plane of line 8—8 of FIGURE 7, this injector being in a different position of operation than the injector of FIGURE 8.

FIGURE 1 shows an embodiment of the invention wherein the liquid lubricant is introduced to filter 22 by supply conduit 21. As a preferred embodiment of the invention, the filter is an inline vessel utilizing a paper cartridge that will filter out any particle size above five microns in the lubricant. The lubricant then enters a reservoir 23, which is a tank with a float valve to allow the reservoir to maintain a reserve of lubricant supply for pump unit 25.

From the reservoir, the lubricant passes to a pressure pump 25. The pressure is controlled by the relief valve 24. The relief valve is of the conventional type composed of a body, valve seat, ball, spring and screw (not shown). As the screw is tightened against the spring it causes the ball to sit harder against the seat. Thus, it takes a higher pressure to push the ball off the seat than the bypass pressure. The pressure may be set at a desired level, and the spring pushing against the ball will make the system maintain a uniform pressure by dumping the excess volume of lubricant back to the reservoir 23.

The pressurized lubricant is then pumped by piston pump 25 to the hydropneumatic accumulator 26. The accumulator is provided to store the high-pressure lubricant.

The pressurized lubricant is introduced to distributor 27. The rotational speed of the distributor rotor is determined by the speed of rotation of the engine shaft and its associated timing belt drive 31 which in turn drives its associated distributor drive timing belt 32.

Distributor output conduits 33 extend from concentric outlet ports provided in the distributor head 34. The lubricant passes from the distributor output conduit 33 to connector 35 which could be a manifold if desired. The pressurized lubricant is passed from conduit 36 to its respective injector 37 and hence from the feed line 71 of the injector to the zone requiring lubrication. The automatic selection of a particular conduit path from the distributor to carry the lubricant to a particular injector is a feature of the invention which is described in detail in a subsequent paragraph of the specification.

The embodiment of FIGURES 2, 3, 4 and 5 is a rotary distributor 27 in accordance with the teachings of the invention. Distributor body 40 is provided to rotatably support the rotor 50 and is attached to the distributor head 34 by means of dowels 41 and bolts 42. The distributor rotor 50 is rotatably supported by bushings 45, and fluid seals 46 are employed to provide a fluidtight seal. Bearings could be used as a substitute for bushings 45.

In the present embodiment, the rotor has a central inlet recess 64 which is connected by passage 53 to an outlet recess 65. Passage 53 is formed by drilling a hole 54 on one side of the rotor after the central inlet recess 64 and the outlet recess 65 are drilled. The hole 54 is tapped and set screw 55 is used as a plug.

Located in the central recess 64 and outlet recess 65 are springs 56, resilient gaskets 52 and metal sleeves 59. The springs 56 may be formed of music wire, and the resilient gaskets 52 of Teflon. Gaskets 52 and sleeves 59 are hollow to allow fluid passage, and a portion of resilient gaskets 52 is countersunk in order to have a tapered wall 57.

The distributor head 34 contains a central inlet opening 60 which communicates with the central inlet recess 64 of the rotor 50, as shown in FIGURES 4 and 5. Concentric outlet ports 47 are provided in the distributor head which supply the fluid to distributor output conduits 53 via lateral passages 48. Outlet ports 47 are radially spaced from central inlet opening 60 substantially the same distance that the center line of outlet recess 65 is spaced from the center line of central inlet recess 64.

In the embodiment shown, it is apparent that at certain times of the rotary cycle, one of the outlet ports 47 will be in communication with outlet recess 65 while the other outlet ports 47 are vented due to spacing 44. The side 66 of the distributor head 34, which is to abut sleeves 59, is highly polished in order to provide a proper fluidtight seal. A venting opening 43 which communicates with venting spacing 44 is provided in the distributor body 40. Conduit 49 can be attached to venting opening 43 to provide a discharge path back to reservoir 23.

In the operation of the present embodiment, the pressurized lubricant enters central inlet opening 60 via conduit 61. As the pressurized lubricant advances from inlet recess 64 to outlet recess 65, timing belt 32 causes the rotor 50 to rotate as seen in FIGURE 3. This rotation is synchronized with the shaft rotation of the engine. The embodiment of FIGURES 2, 3, 4 and 5 is a rotary distributor for an eight-cylinder engine. Hence, at eight times during one cycle of the rotation of the rotor, outlet recess 65 will be in substantial communication with one of the eight concentric outlet ports 47. At these times, the high-pressure lubricant will be injected into the outlet port 47 and will be carried along its corresponding lateral passage 48 to its attached conduit 33, which will then allow the high-pressure lubricant to be introduced by corresponding conduit 36 to the proper injector.

The embodiment of FIGURES 2 and 3 shows the rotary distributor when no outlet port 47 is communicating with the outlet recess 65. FIGURES 4 and 5 show the rotary distributor after the rotor has turned so that outlet port 47 is in substantial alignment with the outlet recess 65 of the rotor 50. It is apparent that while the high-pressure lubricant is injected into one of the outlet ports 47, the other outlet ports are caused to be vented. In other words, they remain at atmospheric pressure. Although the rotor may spin relatively rapidly, since the pressure of a lubricant is high, there is enough time for the proper quantity of lubricant to be forced out through outlet recess 65 into outlet port 47. Venting opening 43 of the distributor body is in communication with venting spacing 44. Hence, a release of pressure is provided from the outlet ports 47 to which lubricating fluid had previously been applied.

A feature of the embodiment shown is a fluidtight sealing located in central inlet recess 64 of the rotor 50 and outlet recess 65 of the rotor 50. The wall 66 of distributor head 34 facing the end of rotor 50 is a highly polished surface and metal sleeves 59, which ride against that surface, maintain a fluidtight seal 62 at that surface. During any period of time that pump 25 and accumulator 26 have built up the usual high pressure, that pressure maintains a fluidtight seal acting against itself by pushing the Teflon gasket 52 hard against the sleeve 59 (which in turn presses against the highly polished surface of the distributor head) and against the surrounding walls of the recess in which the Teflon gasket is located. Gasket 52 is, by its nature, expansible radially, and it responds to the high pressure by pressing both forward and outward. This natural tendency to expand radially is increased in the preferred embodiment of the rotary distributor by countersinking the end of the seal forming a tapered wall 57 so that the pressure can be more effective against the thinner portion of the tapered wall 57 and can force it out more strongly against the surrounding walls of the recess in which the seal is located.

During any build-up period for the high-pressure system before it has reached its operative level, gasket 52 is pressed against sleeve 59 and a fluidtight seal is attained between the two, as shown by reference numeral 63. Sleeve 59 in turn is pressed against the polished face 66 of the cylinder head by spring 56, which is the third element of the assemblage of parts, to form the fluidtight seal 62.

Before the build-up of fluid pressure begins, spring 56 biases gasket 52 normally against sleeve 59. As will be seen, after the high pressure has built up spring 56 performs no further function and simply stands in readiness to press against gasket 52 whenever the high pressure falls low enough that a push from the spring 56 is again necessary.

As is readily apparent, the result of the structure shown is that a fluidtight, high-pressure lubricating system is presented successively at the series of outlet ports 47, while every other outlet port, except the one in momentary communication with the high-pressure system, is always at atmospheric pressure. Consequently, lubricant at high pressure is presented successively to the various injectors 37, which are in communication with outlet ports 47 via lateral passages 48, conduits 33 and 36.

A rotary distributor for a four-cylinder engine, which is another embodiment of this invention, is shown in FIGURE 6, wherein distributor outlet conduits 33 are shown attached to outlet ports 47.

The dual injectors shown in FIGURE 7, which are used in an embodiment of this invention, are mounted in a pair as shown. One of the injectors is shown in greater detail in FIGURES 8 and 9. FIGURES 8 and 9 show injector 37, wherein feed line 71 is connected to the zone requiring lubrication. Tube nut 72 is shown surrounding feed line 71. Tube nut 72 is engaged with outlet body nut 73, which supportedly connects the feed line to injector body 77. Injector 37 comprises a metering site, which contains a check valve 78 resting in seat 76 having helical spring 74 and ball 75, which blocks passage 79 until upward pressure backbiases ball 75 to allow the lubricant in chamber 80 to pass through passage 79 into feed line 71.

The injector arrangement contains plunger assembly 81, which is normally downwardly biased by spring 82 and retained in the position shown in FIGURE 8 by retaining ring 84. Plunger assembly 81, which also carries indicator pin 88, is shown in its most downward position in FIGURE 8, which is the first stage wherein chamber 80 contains a measured quantity of lubricant. Adapter 85 surrounds plunger assembly 81 and is shown joined with injector body 77. Injector adapter 85 contains recess 68, which receives the pressurized lubricant from the distributor, after the lubricant has travelled via distributor output conduit 33 and injector input conduit 36, and thus the lubricant enters the plunger assembly chamber 98. Gasket 83 is provided to act as a fluidtight seal.

The proper amount of lubricant to be injected is measured by an arrangement comprising measuring chamber 95, its corresponding piston 96, and its associated indicating stem 92. In the embodiment shown, piston 96 contains spring 91 with packing retainer 90 and quad ring 86. Spring 91 is biased to allow the piston to move toward chamber 80. The measuring body 97, which surrounds piston 96 and its associated chamber 95, is self-contained within injector cap 93, which is utilized as an adjusting nut 94. Lock nut 87 is provided to position the measuring body 97 and quad ring 86 is provided on the piston in order to help provide the proper compression.

The embodiment of FIGURE 9 shows the second stage of the injector operation, wherein plunger assembly 81 has moved upwardly to force the lubricant in chamber 80 into passage 79 and hence, to feed line 71.

In the operation of the embodiment shown, when lubricant under pressure is not applied to the plunger assembly chamber 98, plunger assembly 81 is maintained in its normally retracted position shown in FIGURE 8 (stage 1) by coil spring 82, which presses downward against flange 89 and retaining ring 84. At the same time, coil spring 91 shown in the piston associated with the measuring chamber 95 urges piston 96 forward in the measuring chamber 95, thus forcing a measured amount of lubricant out of the measuring chamber 95 and into chamber 80. When pressure is applied by incoming pressurized lubricant through recess 68 to plunger 81, this pressure forces plunger 81 upward, and exposes piston 96 to the lubricant under pressure to force it to the right in measuring chamber 95, as shown in FIGURE 9 (stage 2). As a result, the measured amount of lubricant is driven through the outlet check valve 78 via passage 79 into feed line 71 to the point requiring lubrication, and an equal quantity of lubricant is taken once again into the measuring chamber 95.

When the pressure is released in the lubricating supply line which is communicating with inlet 68, the downward bias of spring 82 again drives plunger 81 downward and the leftward bias of spring 91 again drives piston 96 leftward, and again, the lubricant which was measured in chamber 95, is forced into chamber 80, as shown in FIGURE 8.

The lubricating oil under pressure is supplied to successive injectors at the proper time by the rotary distributor valve. Hence, an embodiment is shown in which respective injectors successively receive pressurized lubricant from the distributor outlet ports via conduits 33 and 36. Injectors 37 comprise metering sites which cause the proper amount of lubricant to be measured and injected via feed lines 71 to the zone in which the lubricant is desired.

This system thus provides a controlled apparatus for accurately delivering a measured quantity of fluid under a predetermined pressure to a zone requiring application of fluid. In an embodiment shown, accurately measured quantities of liquid lubricant under pressure are delivered to the moving parts of an internal combustion engine at times synchronized with predetermined cycles or portions of cycles of the internal combustion engine.

All the fundamental novel features of the invention as applied to a preferred embodiment have been shown and described. It will be understood that various omissions and substitutions and changes in the detail and form of the device illustrated and in its operation may be made by those skilled in the art without departing from the spirit of the invention.

What is claimed is:
1. A rotary distributor valve for a fluid distribution system containing:
    (1) distributor head means having
        (a) a central inlet opening and
        (b) a plurality of concentric outlet ports;
    (2) rotor means having
        (a) wall means forming an elongated central inlet recess to receive fluid under pressure from said central inlet opening,
        (b) first sealing means located in said central recess, said first sealing means abutting the wall of the distributor head means defining said central inlet opening to form a fluidtight seal therewith, said first sealing means comprising
            (a') sleeve means abutting said distributor head means,
            (b') resilient gasket means abutting said sleeve means and expansible into snug lateral engagement with said wall of said central recess and urged axially into snug engagement with said sleeve by the pressure of the fluid, and
            (c') spring means normally biasing said gasket means against said sleeve means and the latter against said distributor head means,
        (c) an outlet recess to distribute said fluid under pressure to at least one of said concentric outlet ports at any given time,
        (d) second sealing means located in said outlet recess, said second sealing means abutting the wall of the distributor head means defining said concentric outlet ports to form a fluidtight seal therewith,
        (e) a passage within said rotor means connecting said central inlet recess with said outlet recess; and
    (3) means rotatably supporting said rotor means.
2. A rotary distributor valve for a fluid distribution system containing:
    (1) distributor head means having
        (a) a central inlet opening and
        (b) a plurality of concentric outlet ports;
    (2) rotor means having
        (a) a central inlet recess to receive fluid under pressure from said central inlet opening,
        (b) first sealing means located in said central recess, said first sealing means abutting the wall of the distributor head means defining said central inlet opening to form a fluidtight seal therewith,
        (c) wall means forming an elongated outlet recess to distribute said fluid under pressure to at least one of said concentric outlet ports at any given time,
        (d) second sealing means located in said outlet recess, said second sealing means abutting the wall of the distributor head means defining said concentric outlet ports to form a fluidtight seal therewith, said second sealing means comprising
            (a') sleeve means abutting said distributor head means,
            (b') resilient gasket means abutting said sleeve means and expansible into snug lateral engagement with said wall of said outlet recess and urged axially into snug engagement with said sleeve by the pressure of the fluid, and
            (c') spring means normally biasing said gasket means against said sleeve means and the latter against said distributor head means,
        (e) a passage within said rotor means connecting said central inlet recess with said outlet recess; and
    (3) means rotatably supporting said rotor means.

3. A rotary distributor valve for a fluid distribution system containing:
(1) distributor head means having
- (a) a central inlet opening and
- (b) a plurality of concentric outlet ports;

(2) rotor means having
- (a) first wall means forming a central inlet recess to receive fluid under pressure from said central inlet opening,
- (b) first sealing means located in said central recess, said first sealing means abutting the wall of the distributor head means defining said central inlet opening to form a fluidtight seal therewith, said first sealing means comprising
  - (a') first sleeve means adapted to abut said distributor head means,
  - (b') first resilient gasket means adapted to abut said first sleeve means,
  - (c') first spring means normally biasing said first gasket means against said first sleeve means and the latter against said distributor head means,
  - (d') said first resilient gasket means having a central passage therein, a portion of said passage being of a tapered configuration with the largest diameter of said passage facing said first spring means whereby said first resilient gasket means is expanded laterally into snug engagement with said wall of said central recess and is urged into abutting engagement with said first sleeve means by the pressure of the fluid,
- (c) second wall means forming an outlet recess to distribute said fluid under pressure to at least one of said concentric outlet ports at any given time,
- (d) second sealing means located in said outlet recess, said second sealing means abutting the walls of the distributor head means defining said concentric outlet ports to form a fluidtight seal therewith, said second sealing means comprising
  - (a') second sleeve means abutting said distributor head means,
  - (b') second resilient gasket means abutting said second sleeve means,
  - (c') second spring means normally biasing said gasket means against said sleeve means and the latter against said distributor head means,
  - (d') said second resilient gasket means having a central passage therein, a portion of said second gasket means being of a tapered configuration with the largest diameter of said passage facing said second spring means whereby said second resilient gasket means is expanded laterally into snug engagement with said wall of said outlet recess and is urged into abutting engagement with said second sleeve means by the pressure of the fluid,
- (e) a passage within said rotor means connecting said central inlet recess with said outlet recess; and (3) means rotatably supporting said rotor means.

References Cited by the Examiner

UNITED STATES PATENTS

| | | | |
|---|---|---|---|
| 2,208,845 | 7/1940 | Hillis | 184—7 |
| 2,331,984 | 10/1943 | Kocher | 184—7 |
| 2,406,239 | 8/1946 | Morgenroth | 184—7 |
| 2,546,585 | 3/1951 | Caldwell | 184—35 |
| 2,628,636 | 2/1953 | Brockman | 184—35 |
| 2,840,109 | 6/1958 | Wadleigh | 137—625.11 |
| 2,989,082 | 6/1961 | Ray | 137—625.46 |
| 3,013,633 | 12/1961 | Rotter | 184—7 |
| 3,038,557 | 6/1962 | Callahan | 184—7 |

LAVERNE D. GEIGER, *Primary Examiner.*

MILTON KAUFMAN, *Examiner.*

H. BELL, *Assistant Examiner.*